Sept. 18, 1951   H. C. GROSSMAN   2,568,231
VEHICLE SPRING HOLDING DEVICE
Filed March 9, 1950
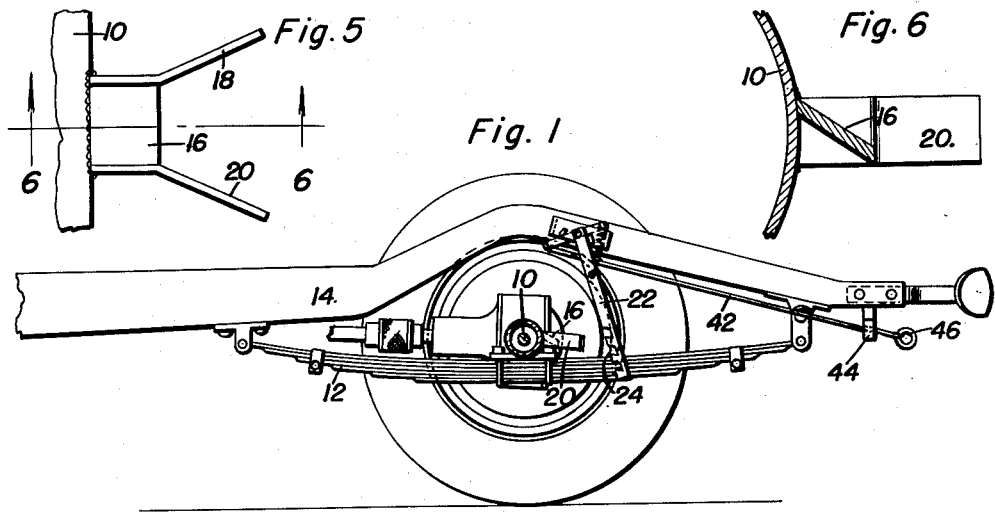
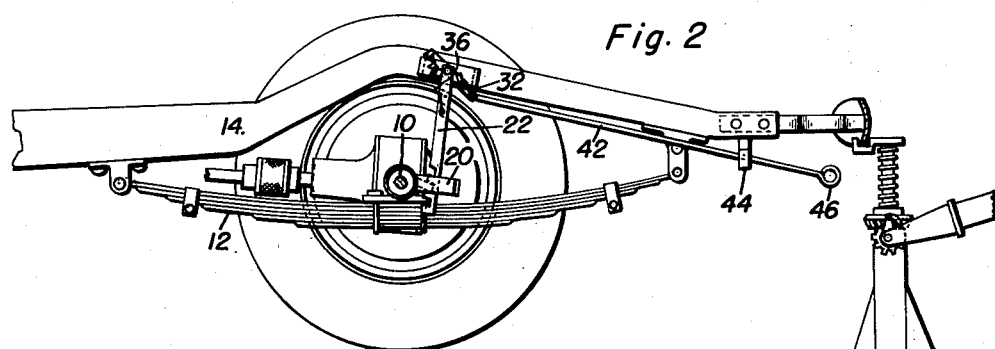
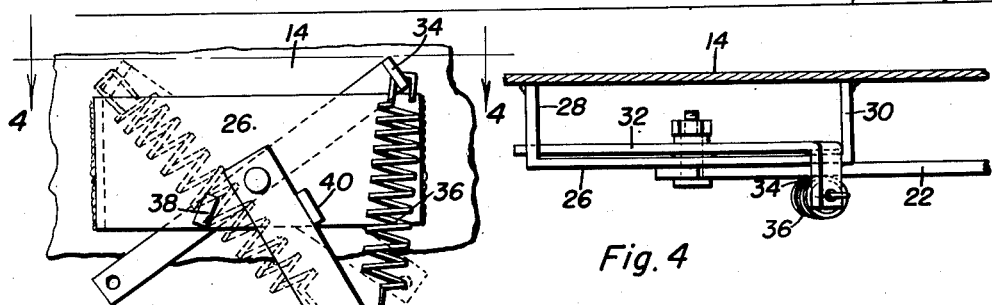
Harry C. Grossman
INVENTOR.

Patented Sept. 18, 1951

2,568,231

UNITED STATES PATENT OFFICE 2,568,231

VEHICLE SPRING HOLDING DEVICE

Harry C. Grossman, Baltimore, Md.

Application March 9, 1950, Serial No. 148,579

6 Claims. (Cl. 280—150)

This invention relates to lifting apparatus for automotive vehicles, and more particularly to an attachment which may be readily secured to an automotive vehicle so as to enable the vehicle to be more easily jacked up so that the wheels thereof clear the ground.

An object of this invention is to provide a device which will securely lock the axle of an automotive vehicle to the frame to enable the wheels of the vehicle to be more readily lifted using a conventional bumper jack or the like.

A further object of the invention is to provide an attachment which may be readily attached to an automotive vehicle so as to enable the vehicle to be lifted by a conventional bumper jack, the wheels of the automobile being lifted above the ground without necessitating lifting the frame of the automobile or like vehicle more than the amount that it is desired to raise the vehicle wheels off the ground.

Another object of this invention is to provide a jacking mechanism which may be readily installed for locking the front or rear axles of an automotive vehicle to the frame so that upon jacking of the automobile the wheels thereof will be raised, corresponding to the amount that the frame of the vehicle is raised.

As is well known, when using a bumper jack for jacking the wheels of a vehicle off of the ground so as to enable the change of wheels or tires, the frame of the automobile is lifted, the axle on which the wheels are attached is suspended by the coil or leaf springs to the frame, and hence it is necessary to jack the frame upward an amount equal to the amount the springs will flex due to the weight of the axle and wheels in addition to the added amount that it is desired to raise the wheels above the road bed. Accordingly, it is an object of the invention to eliminate the amount of jacking that is due to the flexure of the suspension springs of the axle, which device includes a bracket having a latch rod secured thereto for pivotal movement, a lever pivotally secured to the bracket, and a spring terminally secured to the latch rod and the lever so as to urge the latch rod into an operative or inoperative position and so as to maintain the latch rod in this position.

Still further objects of the invention reside in the provision of an attachment for an automotive vehicle that is strong, durable, highly efficient in operation, simple in construction and design, capable of being attached to a frame and axle of almost any automotive vehicle, which is readily adaptable for use in automobiles having coil or leaf spring suspension, and which is relatively inexpensive.

These, together with the various ancillary objects of the invention which will become apparent as the following description proceeds, are attained by this jacking mechanism, a preferred embodiment of which has been illustrated in the accompanying drawings, by way of example only, wherein:

Figure 1 is a side elevational view of the jacking mechanism shown in operative emplacement on an automotive vehicle in an inoperative position;

Figure 2 is a side elevational view similar to that shown in Figure 1, but showing the device in its operative position;

Figure 3 is an enlarged elevational view of the invention showing the parts thereof in greater detail;

Figure 4 is a vertical sectional view as taken along line 4—4 in Figure 3;

Figure 5 is a top plan view of the latch which is secured to the axle and which comprises one element of the invention; and Figure 6 is a vertical sectional view as taken along line 6—6 in Figure 5.

With continued reference to the accompanying drawings, wherein like reference numerals designate similar parts throughout the various views, the reference numeral 10 generally designates an axle of an automotive vehicle which is suspended by springs 12 from the frame 14 of the vehicle. The springs 12 may be leaf springs as are conventionally used to suspend the rear axles of an automobile but may be coil springs, transverse leaf springs, or any other suitable means for suspending the axle 10 from the frame 14 of the vehicle.

The invention consists of two elements, one of which is shown in greater detail in Figures 5 and 6 and which comprises a latch adapted to be welded to the axle 10, and which comprises a latch plate 16 diagonally disposed relative to outwardly diverging guide plates 18 and 20. The guide plates are provided to direct the latch rod 22 into engagement with the latch plate 16. The latch rod 22 is provided with a series of notches 24 for secure engagement with the latch plate 16.

The latch rod 22, together with its associated elements, comprises the other portion of the invention and is pivotally secured to a U-shaped bracket 26, the legs 28 and 30 of which are welded to the frame 14. Obviously, the bracket 26 may be secured by any other suitable means such as bolting or riveting to the frame 14. Additionally, there is pivotally attached to the bracket 26 on the side opposite from the side against which the rod 22 is pivoted a lever 32 of substantially L shape which comprises an upper arm 34 projecting outwardly over the top edge of the bracket 26. A spring 36 is terminally secured to the arm 34 and a portion of the rod 22 medial the ends thereof. A pair of lugs 38 and 40 are welded to the bracket 26 and are of such shape as to limit the amount of rotation of the lever 22. An actuating or control rod 42 is pivotally attached to the end of the lever 32 opposite to the arm 34 and is slidably mounted relative to the frame 14 by a suitable bracket 44. The rod 42 is provided with a pull or push ring 46, and may be readily provided with a suitable handle or knob as desired.

With the invention emplaced upon the automotive vehicle and in the position as shown in Figure 1, in order to lock the axle 10 to the frame 14, it is merely necessary to pull back on the rod 42 which will pull the lever 32 to a position approximately parallel to the rod 22. By pulling slightly more on the rod 42, the spring 36 will be swung to an over-center position whereupon it will very strongly urge the rod 22 into engagement with the latch plate 16, thus locking the axle and frame together. To release the axle from the frame, it is merely necessary then to push forward on the rod 42 to return the spring 36 to over-center position in the opposite direction. Obviously, with the frame and axle locked together, by lifting somewhat on the frame the axle will be lifted, thus preventing the spring suspension 12 from flexing. This elimination of the flexure in the spring will decrease the amount of distance that is necessary to jack the frame of the car, and thus it will enable the change of a tire or wheel to be made with greater ease.

Since, from the foregoing, the construction and advantages of this jack mechanism are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. A device for selectively locking the axle of an automobile to the frame thereof comprising a bracket adapted to be secured to the frame of a vehicle, a latch rod pivotally secured to said bracket, a series of notches on said rod, a lever pivotally attached to said bracket whereby said lever is pivotable to an over-center position relative to the pivoting point of said latch rod, a spring terminally attached to said latch rod and said lever, said spring being attached to said latch rod below the rod pivot point, a latch plate on the axle, said spring selectively holding said latch rod in engagement with or out of engagement with said latch plate.

2. A device for selectively locking the axle of an automobile to the frame thereof comprising a bracket adapted to be secured to the frame of a vehicle, a latch rod pivotally secured to said bracket, a lever pivotally attached to said bracket whereby said lever is pivotable to an over-center position relative to the pivoting point of said latch rod, said lever including an arm adapted to engage said bracket to limit the amount of rotation of said lever, a spring terminally attached to said rod and said lever, said spring being attached to said latch rod below the rod pivot point, a latch plate on the axle, said spring selectively holding said latch rod in engagement with or out of engagement with said latch plate, said spring further holding said arm in contact with said bracket.

3. A device for selectively locking the axle of an automobile to the frame thereof comprising a bracket adapted to be secured to the frame of a vehicle, a latch rod pivotally secured to said bracket, a lever pivotally attached to said bracket whereby said lever is pivotable to an over-center position relative to the pivoting point of said latch rod, a spring terminally attached to said rod and said lever, said spring being attached to said latch rod below the rod pivot point, a latch plate on the axle, said spring selectively holding said latch rod in engagement with or out of engagement with said latch plate, and a pair of spaced lugs secured to said bracket to limit the pivotal movement of said rod relative to said bracket.

4. A device for selectively locking the axle of an automobile to the frame thereof comprising a bracket adapted to be secured to the frame of a vehicle, a latch rod pivotally secured to said bracket, a lever pivotally attached to said bracket whereby said lever is pivotable to an over-center position relative to the pivoting point of said latch rod, said lever including an arm adapted to engage said bracket to limit the amount of rotation of said lever, a spring terminally attached to said rod and said lever, said spring being attached to said latch rod below the rod pivot point, a latch plate on the axle, said spring selectively holding said latch rod in engagement with or out of engagement with said latch plate, said spring further holding said arm in contact with said bracket, and a pair of spaced lugs secured to said bracket to limit the pivotal movement of said rod relative to said bracket.

5. A device for selectively locking the axle of an automoboile to the frame thereof comprising a bracket adapted to be secured to the frame of a vehicle, a latch rod pivotally secured to said bracket, a lever pivotally attached to said bracket whereby said lever is pivotable to an over-center position relative to the pivoting point of said latch rod, a spring terminally attached to said rod and said lever, said spring being attached to said latch rod below the rod pivot point, a latch plate on the axle, said spring selectively holding said latch rod in engagement with or out of engagement with said latch plate, and a control rod for actuating said lever pivotally secured to said lever.

6. A device for selectively locking the axle of an automobile to the frame thereof comprising a bracket adapted to be secured to the frame of a vehicle, a latch rod pivotally secured to said bracket, a lever pivotally attached to said bracket whereby said lever is pivotable to an over-center position relative to the pivoting point of said latch rod, said lever including an arm adapted to engage said bracket to limit the amount of rotation of said lever, a spring terminally attached to said rod and said lever, said spring being attached to said latch rod below the rod pivot point, a latch plate on the axle, said spring selectively holding said latch rod in engagement with or out of engagement with said latch plate, said spring further holding said arm in contact with said bracket, and a pair of spaced lugs secured to said bracket to limit the pivotal movement of said rod relative to said bracket, and a control rod for actuating said lever pivotally secured to said lever.

HARRY C. GROSSMAN.

REFERENCES CITED

The following references are of record in the file of this patent:

UNITED STATES PATENTS

| Number | Name | Date |
|---|---|---|
| 2,050,543 | Peeples | Aug. 11, 1936 |
| 2,096,636 | Green | Oct. 19, 1937 |

FOREIGN PATENTS

| Number | Country | Date |
|---|---|---|
| 108,216 | Australia | Aug. 8, 1939 |